United States Patent [19]
Lehmann

[11] Patent Number: 5,756,953
[45] Date of Patent: May 26, 1998

[54] ELECTROEROSION MACHINE FOR WIRE CUTTING A STATIONARY WORKPIECE

[75] Inventor: Hans Lehmann, Vessy, Switzerland

[73] Assignee: Charmilles Technologies SA., Switzerland

[21] Appl. No.: 496,948

[22] Filed: Jun. 30, 1995

Related U.S. Application Data

[63] Continuation-in-part of Ser. No. 891,798, Jun. 1, 1992, and a continuation-in-part of Ser. No. 260,489, Jun. 15, 1994, and a continuation-in-part of Ser. No. 381,017, Jan. 31, 1995, abandoned.

[30] Foreign Application Priority Data

May 31, 1991 [CH] Switzerland ............... 01622/91-9

[51] Int. Cl.⁶ ................................................. B23H 7/02
[52] U.S. Cl. ................................................. 219/69.12
[58] Field of Search ........................ 219/69.11, 69.12, 219/69.14

[56] References Cited

U.S. PATENT DOCUMENTS

| | | | |
|---|---|---|---|
| 4,387,286 | 6/1983 | Inoue | 219/69.14 |
| 4,786,776 | 11/1988 | Ramsbro | 219/69.12 |
| 4,808,787 | 2/1989 | Futamura | 219/69.12 |
| 4,973,812 | 11/1990 | Aramaki et al. | 219/69.12 |
| 5,012,063 | 4/1991 | Kawanabe et al. | 219/69.12 |
| 5,015,814 | 5/1991 | Morishita | 219/69.12 |
| 5,070,224 | 12/1991 | Topfer et al. | 219/69.12 |

*Primary Examiner*—Geoffrey S. Evans
*Attorney, Agent, or Firm*—Gifford, Krass, Groh, Sprinkle, Patmore, Anderson & Citkowski, P.C.

[57] ABSTRACT

An electroerosian wire cutting machine with a stationary workpiece in which the machining heads with wire guides are operated by two cross-slide systems along two parallel planes on either side of the machining area with the workpiece placed and clamped on pillars that are stationary with respect to the main frame of the machine including a stand which supports the pillars and which is made up of vertical elements connected together to form a space open one face with a collector fitted in a hollow space set in the stand below the machining heads to collect used electrode wire and dielectric machining fluid.

17 Claims, 6 Drawing Sheets

ELECTROEROSION MACHINE FOR WIRE CUTTING A STATIONARY WORKPIECE

This is a continuation-in-part of copending application Ser. No. 07/891,798 filed on Jun. 1, 1992 Ser. No. 08/260, 489 filed on Jun. 15, 1994 (FWC). Ser. No. 08/381,017 filed on Jan. 31, 1995 (FWC).

This invention relates to an electroerosian wire cutting machine with a stationary workpiece in which the machining heads equipped with wire guides are operated by two cross-slide systems along two parallel planes on either side of the machining area, whilst the workpiece is placed and clamped on pillars that are stationary with regard to the main frame of the machine. The wire electrode, which is unwound through the machining area, that is the slot cut into the workpiece to be machined, and progresses along it according to a predetermined path, may also simultaneously slant with respect to the machining plane according to a predetermined angle.

BACKGROUND OF THE INVENTION

Existing wire cut spark erosion machines can be of two types: either of the C or of the gantry type.

For both types the main frame consists of a stand supporting a work tank for collecting the dielectric machining fluid; pillars are mounted on the bottom of said tank to support the workpiece clamping system.

In the C form, a vertical column is connected rigidly to this stand and two arms (or brackets), each supporting a machining head at its end, are mounted extending over this column. The lower arm is fixed at an appropriate height, so that the lower head can be placed between the workpiece and the bottom of the work tank and the upper arm, which extends over the work tank, is movable vertically (Z movement) so that the distance between the upper machining head and the work piece can be adjusted. The relative movement between the machining heads and the workpiece (X,Y movement) is generally obtained through a cross-slide system mounted on the stand, below the work tank (it is the workpiece which is mobile). This system may also be incorporated into the column (it is the lower arm which is mobile). The slant of the wire (that is the deplacement of the upper head along the U and V axes) is achieved by a second cross-slide system mounted on the upper arm, either at the end of a saddle moving along the Z axis and supporting the machining head, or at the point where said arm is attached to the column.

In the gantry type, two columns are raising on either side of a stand and are joined rigidly to a crossbeam, on which the upper arm is mounted, both overhanging the machining area and a work tank. That arm can generally not only move vertically (deplacement along z axis) in order for the distance between the upper machining head and workpiece to be adjusted (as in most of machines of C type), but also along said crossbeam, along axis X. The workpiece is most often mobile, at least along Y axis. However, spark erosion wire machines of the gantry type with stationary workpiece are known (for example from FIGS. 1 and 2 of FR 2 099 848).

The gantry construction is known to be more rigid, stable and less susceptible to vibrate than the structure in C, but have the disadvantage that the workpiece is much less accessible than in C type machines. That is why the gantry machines are generally provided with a work tank with removable or telescopic walls or with a tank dropable in the stand in order to clear the work table supporting the work piece and its clamping system, or with means to shift the work table relating to the gantry columns (this relative movement along the Y axis can be achieved with a movable gantry or a saddle slide carriage supporting the work tank, the workpiece and its clamping system).

A machine of the gantry type with stationary workpiece and with a work tank dropable in the stand is described in German patent application DE 38 41 314. It has the advantages of providing the rigidity of the gantry type constructions which also provides two superposed and independent cross-slide systems which allow machining large tapers. But the space provided in the stand for receiving the drop tank increases the room occupied on the floor by that machine in comparison with other known machines, which have themselve the disadvantage of not being very compact, since it is always necessary to provide one or more tanks outside the frame stand, in particular for the dielectric liquid and the used wire electrode.

Other disadvantages of gantry type machines with stationary workpiece are described in above mentioned FR 2 099 848 in which the use of C structured machines using a (U,V) system dependent on the (X,Y) system is advocated in preference to gantry machines and a (U,V) system independent of the (X,Y) system. All this has led the applicant to seek a structure without the above described inconveniences of the known C type or gantry type machines In association with a moving workpiece driven in a horizontal plane, some manufacturers came to the idea of using a hollow chamber set under the machining zone to collect the used wire, as disclosed for example in U.S. Pat. No. 4,808,787, in USSR Patent 657 948 of CHALIKOV or in JP 63-105821. As taught by CHALIKOV, the advantages of such a structure is a more simple, smooth and accurate taking up of the used wire, with reduction of the fluctuations or vibrations of the wire. All these three references teach that a horizontal tightening element has to be provided for isolating the lower machining head from the machining liquid; the element therefore separates the space of the bed which receives the used wire and contains the unwinding system for the wire, from the machining zone. A difficulty is to arrange for the lower, upright standing arm so that it doesn't collide with the X, Y worktable.

SUMMARY OF THE INVENTION

The objective of this invention is to remedy these disadvantages by creating a wire electrode cutting machine
- whose mechanical construction is simple and rigid, so that, in particular, precision machining of heavy pieces is possible,
- where the workpiece is accessible from all sides of the machining area and the latter to be as unencumbered as possible, so that, by taking advantage of all machine travel, pieces of much greater dimensions can be machined than with existing machines of a similar size,
- that is much more compact than known wire electrode cutting machines, the entire area under the machining area up to the bottom of the stand being available for collecting the spent wire electrode and used dielectric fluid.

To this end, the wire electroerosion machine with stationary workpiece according to the present invention does neither comprise a work tank nor a work table set on the stand; it is equipped with two arms carrying each a machining head which guides the electrode-wire and injects machining fluid between the electrodes, the arms being mounted on two cross-slide systems located on either side of the machining plane; it is characterized by:

a stand made up of vertical elements, connected together to form a space open on one face such as an "U", pillars mounted directly on the stand and supporting the clamping system for the workpiece and a collector fitted in the hollow space set in the stand, down below the elements of the stand, under the clamping system, for collecting the used wire-electrode, and, for most of the variants of the present invention, also the spent dielectric machining fluid.

In many of the variants of the present invention, the space enclosed by the stand extending from the lower machining head to the collector is thus empty. In some other variants for immersion machining, it may be advantageous to separate the used wire-electrode from the spent dielectric machining fluid, and in this case an element may be provided for separating the space under the machining area in two parts.

In a preferred embodiment of the present invention, the cross-slide systems are totally independent and positioned on either side of the workpiece, allowing taper cut machining without any limitation regarding the angle of inclination of the wire. "Totally Independent" cross-slide systems means systems which are not connected by any mechanical connection. In another preferred embodiment of the present invention, a crossbeam is secured on one or more elements of this stand for bearing both cross-slide systems.

The collector may be a tank smaller than the stand and disposed within the stand (as illustrated in FIG. 4); it may also be larger than the stand which is then liquid tight in it (as illustrated in FIG. 6). The collector may also be constituted by the stand itself (as illustrated in FIGS. 5 and 7).

The machine according to the present invention is a wire EDM machine without a machining tank and without a regular work table set on its stand. After crossing the machined slot and the lower machining head, the wire electrode ends up directly in the collector and accumulates on the bottom of the stand, providing thus a great simplification of the machine: it is no longer necessary to provide a system of belts or of compressed fluids for transportation of the wire towards the rear of the machine. Moreover, in aspersion machining, this receptacle also collects the dielectric fluid. It may also be provided with a protective device allowing it to hold the machining liquid up to the workpiece and the upper machining head: the machine of the present invention can thus be used also for immersion machining. In some variants of the present invention this protective device acts as one of the walls of a work tank and may be movable along the walls of the stand. In other variants of the present invention, a liquid tight element, connected with a telescopic or elastic device which binds it to the lower machining head, is provided for separating in two parts the hollow space set under the machining area, the upper one retaining the liquid, the other receiving the used wire and isolating it from the machining liquid. This liquid tight element may be retractable, for example for draining of, at the end of a machining step, the used liquid held in the machining area.

The collector may also serve as a "contaminated tank" and it will therefore no longer be necessary to provide for the drainage of a work tank.

The design of the machine stand no longer corresponds to a caisson enclosed on all sides and topped by a table. It is thus able to collect the spent dielectric machining fluid and the used wire-electrode. One is therefore left with a structure which is less bulky. It is no more necessary to provide one or more outside tanks for the dielectric liquid and the used wire electrode. In some variants for aspersion machining, there is no need to surround the machining area with protective walls; the entire area between the surface of the fastening pillars and the upper machining head may thus be taken up by the workpiece. There is no lateral obstacle on three sides; the deplacements of the machining heads are no more impeded by the walls of a work tank. The upper arm is movable along an Y axis and is thus able to bring the upper heads near and against the crossbeam. Thus the clamping operations for the workpiece are highly facilited and, for a machine of a given size, one can machine pieces which are considerably taller, wider and longer (and heavier) than with known machines of a similar size.

In the embodiment where a crossbeam bearing both cross-slide systems, is secured on one or more elements of the stand of the machine, it may be removable or not, according to the embodiment, preferably to form a symmetrical arrangement. When a crossbeam supports a cross-slide system below the lower face, shoulders are provided on elements of the stand to provide the necessary place. This construction, consisting of one or more gantries, is very rigid. Furthermore, the gantry construction is not only advantageous because of it being completely rigid but another advantage lies in the ability to perform a broad Z movement without increasing the cost of the machine.

The workpiece is stationary and no saddle slide carriage of the cross-slide system has to be displaced by supporting a heavy workpiece and its clamping system; the precision of the machining and the reproductibility thereof is therefore practically independent of the weight of the workpiece. Moreover, in most of its operating modes, the lower arm extends one of the saddle slide carriages of its cross-slide system; long protrusions are thereby avoided. This ensures complete rigidity and excellent precision in cutting. It is no longer necessary to arrange for the lower arm not to collide with elements of a moving worktable; in particular, all the intricated arrangements disclosed in U.S. Pat. No. 4,808,787 and JP 63-105821 for isolating the lower arm and its machining head which is protruding throughout the X,Y crosstable driving the workpiece, and for preventing it from colliding, are no longer needed.

But above all, it is known that temperature variations of the dielectric bath contained in the work tank are not transmitted uniformly to the main frame of the machine which then gets out of shape uncontrollably. On the contrary, in the variants of this invention for aspersion machining where the stand of the machine either soaks in the tank collecting the used wire-electrode and the used dielectric fluid, or contacts the fluid, all temperature variations are transmitted uniformly to the main frame and thus to all devices of the machine. Moreover, the ambient air can circulate freely throughout the machining area, since no table or tank will impede it. In the variants for immersion machining, the machining liquid has a large contact surface with the frame, since a part of the stand plays the role of a machining tank. In both cases the dissipation of the heat due to machining is accelerated; this equalizes the temperature of the apparatus while obviating a change in the relative position of the workpiece and the machining heads caused by differences in thermal expansion. The precision and the reproducibility of the machining is thereby increased.

As the variant where the two cross-slide systems are totally independent, the system moving the lower machining head along the axes X1 and Y1, being not connected mechanically to the system which moves the upper machining head along the axes X2 and Y2, the wire may be slanted at practically any angle. A saddle slide carriage designed to move the upper machining head along the vertical axis Z is generally mounted on the upper saddle slide carriage of the cross-slide system which moves horizontally along the axes X2 and Y2.

As a first variant, the cross-slide systems may be arranged as described in patent application DOS 38 41 314, i.e. above and below a single horizontal crossbeam resting on two shoulders of the stand. But this invention is not in the least restricted to this particular structure. In other variants, each of two crossbeams are fixed to an element of the stand forming the branches of a U; one is secured on shoulders and carries on its lower face the cross-slide system for the lower arm while the other carries the cross-slide system for the upper arm on its upper face. The same arrangement could be achieved with only one crossbeam which would bear the cross-slide system for the lower arm, with the cross-slide system intended for the upper arm being fixed to the element of the stand directly opposite it at the appropriate height. Two of the above-mentioned crossbeams may be fixed to two adjacent elements of the stand, the one bearing the cross-slide system to the lower arm and the other the cross-slide system for the upper arm. Alternatively, a crossbeam which would carry the cross-slide system for the lower arm could be fixed to one of the elements of the stand forming a branch of a U, while the adjacent element would be raised and carry the cross-slide system for the upper arm directly. Both cross-slide systems may be mounted so that they actuate the machining heads in a vertical plane, the machining path being itself in a vertical plane; in this case there are no "upper" and "lower" heads. The lower head may also be mounted on an arm protruding from one wall of the stand, and the upper head on a column fixed with the stand.

The crossbeam(s) and the parts of the cross-slide movement systems may be modular and interchangeable with others of different sizes or materials. The stand may be made up of a single or several parts, welded to form a rigid whole. The parts, not necessarily perpendicular, may form a U which is more or less opened up. They may take on various forms and use different collars, shoulders edges, etc.

The cross-slide systems may be of any known design which provide durable long life and high precision movement e.g. of the needle type such as the pretensioned double V guideways equipped with a needle cage; with mechanical, hydraulic or pneumatic drives; with sliding rails and saddle slide carriages; with carriages and tracks which are adjustable if necessary. They may be fitted with anti-collision systems on all the axes which detect, for example, any irregular force greater than some tens of kilogramms. The actual position of each carriage or saddle slide carriage may be estimated by angle encoders situated at the end of each bolt which moves the saddle slide carriage. But the position is preferably read directly on level with the piece with the help of precision digital (optical) linear guides which enable the path sliced through the piece to be determined with precision. Moreover, software for the correction of this position, for example, by a precision laser measurement of the position of the coordinates X1, Y1, X2 and Y2, may be provided together with a customized software programme for the autocorrection of the machine.

A device to cut the used wire-electrode into pieces or to crimp or curl it, such as those widely used in practice, may be fixed to the lower arm or machining head.

Some of the particularly advantageous embodiments are as follows:
- the machining area may be screened from the mechanical devices which activates the movement of the machining heads, in particular by means of a partition wall which would only let through the arms bearing the machining heads. The former may be connected, for example to other walls rising up behind the stand and even form part of a double cubicle, such as that described in EP 572 718;
- a cubicle or a block made of high walls with a part sliding laterally or vertically, as described in EP 572 718, may be set up around the machine frame, if desired around the parts of the dielectric circuit, and even encompass the electrical cabinets containing the pulses generator and numerical control unit; a cubicle can also be provided with several or all walls displacable upright as a whole;
- a tank is used as a receptacle for the used wire-electrode and dielectrical fluid, in which the base of the stand is immersed such as the dielectric fluid supply circuit equipment, this tank together with all the other components of the machine, including the electrical cabinet containing the pulses generator and the numerical control unit, may be installed on the same chassis or "pallet". The various components of the machine are integrated at the time of assembly during manufacture, which greatly facilitates the installation of the machine, renders it very convenient to transport and decreases its operating costs, as the ground area is very much less than that required for similar known machines.

DESCRIPTION OF THE DRAWINGS

Below, the machine is depicted in greater detail with the help of drawings representing only some of the embodiments as non restricting examples. Any modification to the shape or points of detail may be made to said machines without compromising the spirit of the invention.

The same reference numbers as for FIG. 1 to 3 are used in FIG. 4 to 7 to identify identical parts.

DESCRIPTION OF SEVERAL PREFERRED EMBODIMENTS OF THE PRESENT INVENTION

Figure 1:
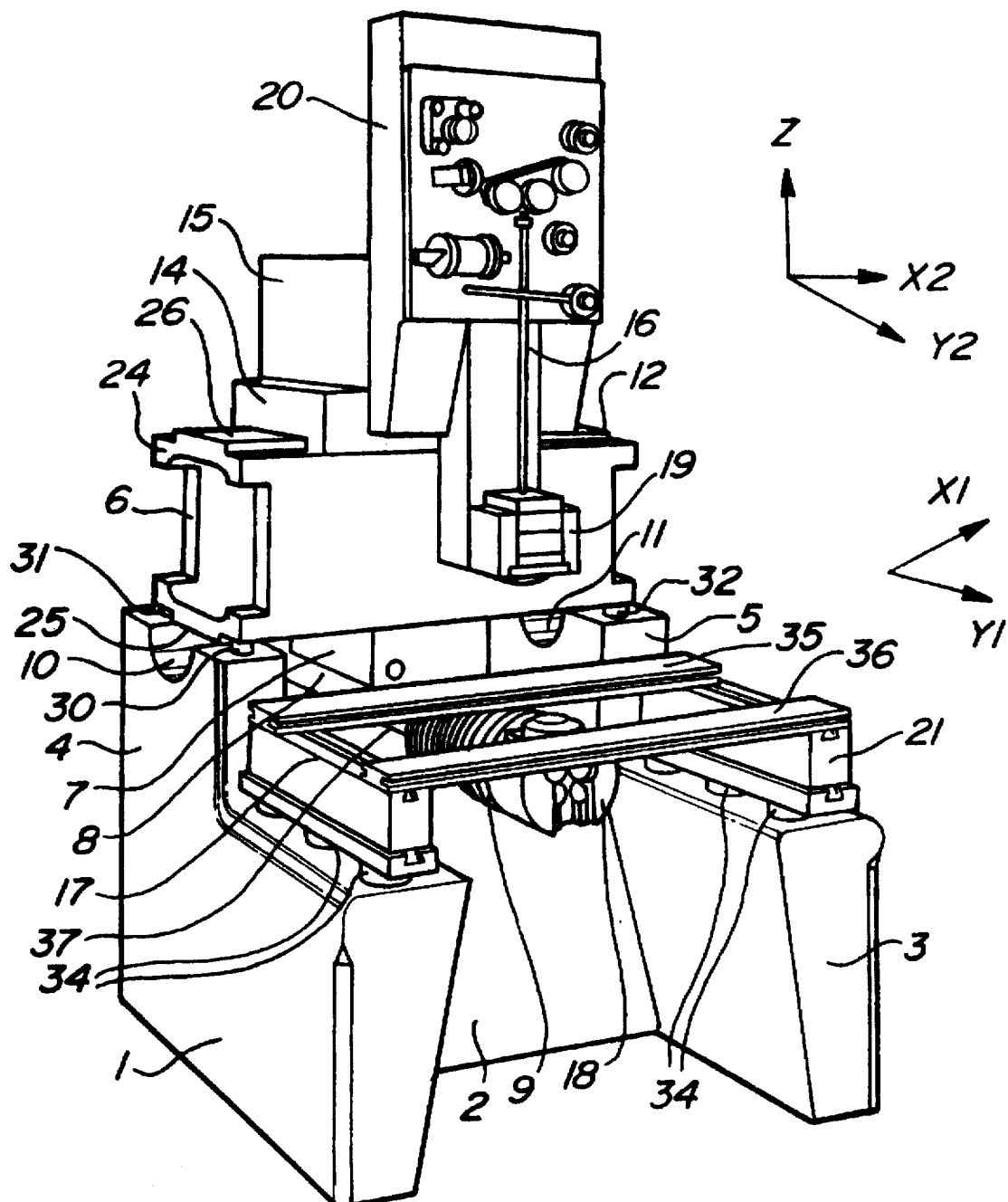
FIG. 1 is a simplified view of the frontal part and of one of the sides of the frame of a machine for aspersion machining, according to one of the variants of the present invention.

The frame of the machine shown in FIG. 1 consists of a stand made up of three perpendicular walls 1, 2 and 3. Walls 1 and 3, each present a shoulder 4 and 5 on which crossbeam 6 is resting. Wall 2 is shorter than walls 1 and 3 (which have shoulders), in order to provide sufficient space for the cross-slide system consisting of the carriages 7 and 8 and for a lower arm 9. The stand is made of Rhenocast (R) (a trademark designating a polymerized concrete of the company George Fischer). This unalterable material which is rustproof and also acts as a thermic and electrical insulator, is most suitable for this use, because the stand is intended to be in contact with the used dielectric fluid and the already electrically charged electrode wire which comes out of the lower machining head 18. Its density is only a third of that of steel for a comparable thermic expansion coefficient, 1 2 μm/degree/mn. This stand could, however, be manufactured from any other material known for this use: cast iron, brazed steel, hydraulic concrete, ceramic, etc.

The recesses 10 and 11 in shoulders 4 and 5 house the movement bolt (not visible in FIG. 1), which activates the saddle slide carriage 7 and which is mounted on the lower face of the crossbeam 6. The crossbeam 6 is rectangular and hollow. It is secured by the fastening elements 30, 31, 32 and 33 (the latter is not visible in FIG. 1) of a known kind, which interact with corresponding cavities in the shoulders 4 and 5. It is equipped with four rails along its upper surface (rails 12 and 13) and lower surface (rails 22 and 23) of which only rail 12 is visible in FIG. 1. They are prestressed, raised V-shaped sections, and are mounted on either side of the central projecting part 24 on the upper surface (rails 12 and 13), respectively part 25 on the lower surface (rails 22 and 23). These rails serve to guide a saddle slide carriage 14 along axis X2 (or U) and the saddle slide carriage 7 along the axis X1 (or X). These guides and those between the two saddle slide carriages of the same cross-slide system are of the prestressed double "V" type, equipped with needle cages. Each of these two saddle slide carriages 7 and 14 interact with a saddle slide carriage, 8 and 15 respectively, arranged to move orthogonally on the axes X1 and X2. These systems are highly rigid and allow a precise and reproductive cut.

The saddle slide carriage 8 is prolonged by the lower arm 9 bearing a lower machining head 18. Bellows 37 shelters the lower arm 9 from the machining liquid sprayed from the machining heads to cool the machining area and remove the waste caused by electrical erosion.

The saddle slide carriage 15 is prolonged by the upper arm (not visible in FIG. 1) and carries a vertical part 16 which contains a device 20 of a known kind, only the covering of which is visible in FIG. 1. The former activates the upper machining head 19 to slide along a rack arranged along the axis Z. This vertical part also supports the various wire-electrode supply mechanisms.

The crossbeam 6 and the carriages 7, 8, 14 and 15 are made of cast iron. They could however be made of any other material known for this purpose: soldered steel, cast iron, ceramic, etc. Two granite pillars 17 and 21 are, with the aid of six elements 34, secured on the upper surface of the walls 1 and 3, which are positioned below the shoulders 4 and 5. They are fitted with a rail suitable for supporting components of a clamping system of a known type; shown here are the grooved rails 35 and 36 of a CT1000 SYSTEM. A transparent and movable protective wall 49 closes up laterally an area 50 set between the bottom of a tank 45 and the machining head 18, where the used wire piles up.

Figure 2:
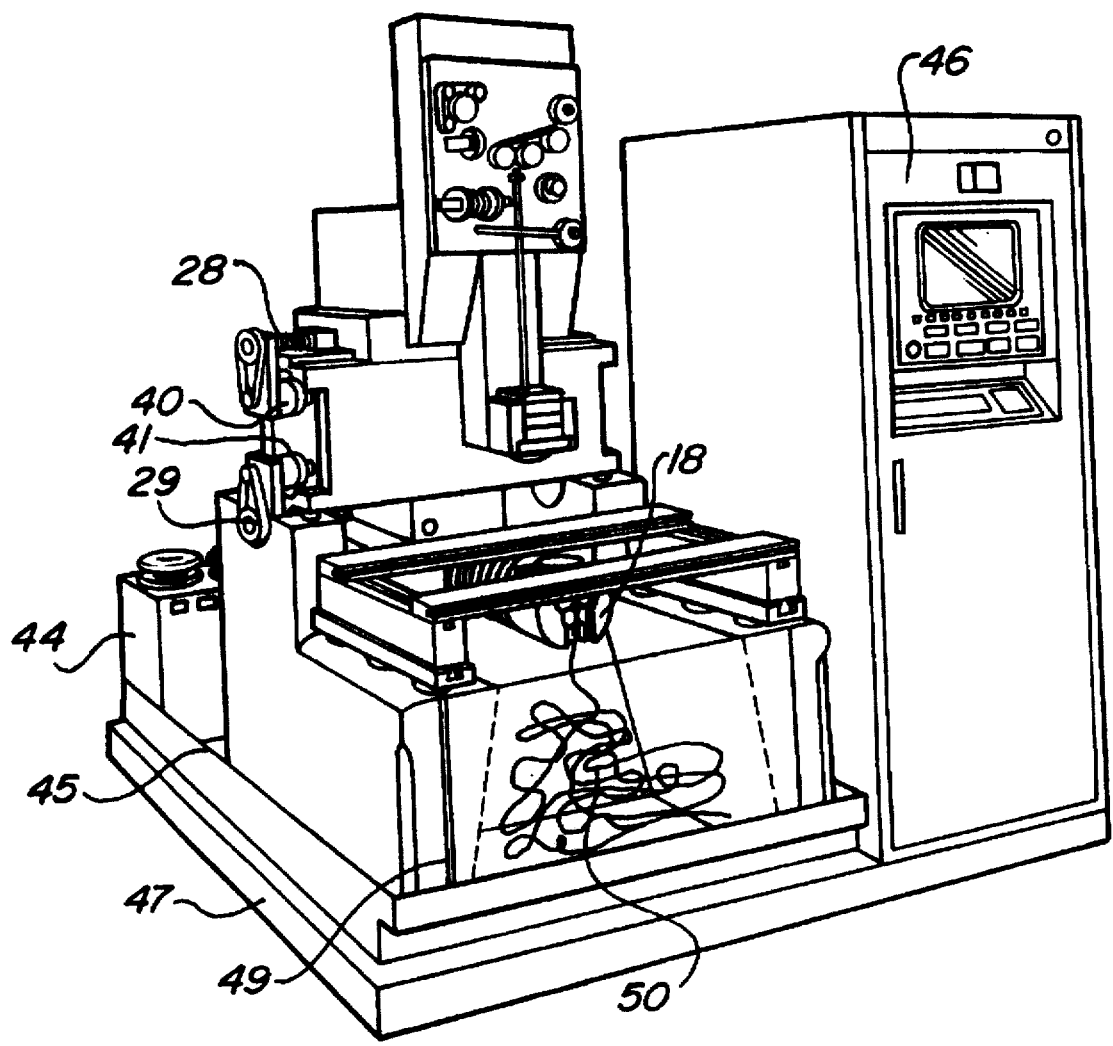
FIG. 2 is a diagram of a variant of a machine for aspersion machining, in which all the constituents, including the switch cabinet and the numerical control unit, are arranged on a single pallet.
Figure 3:
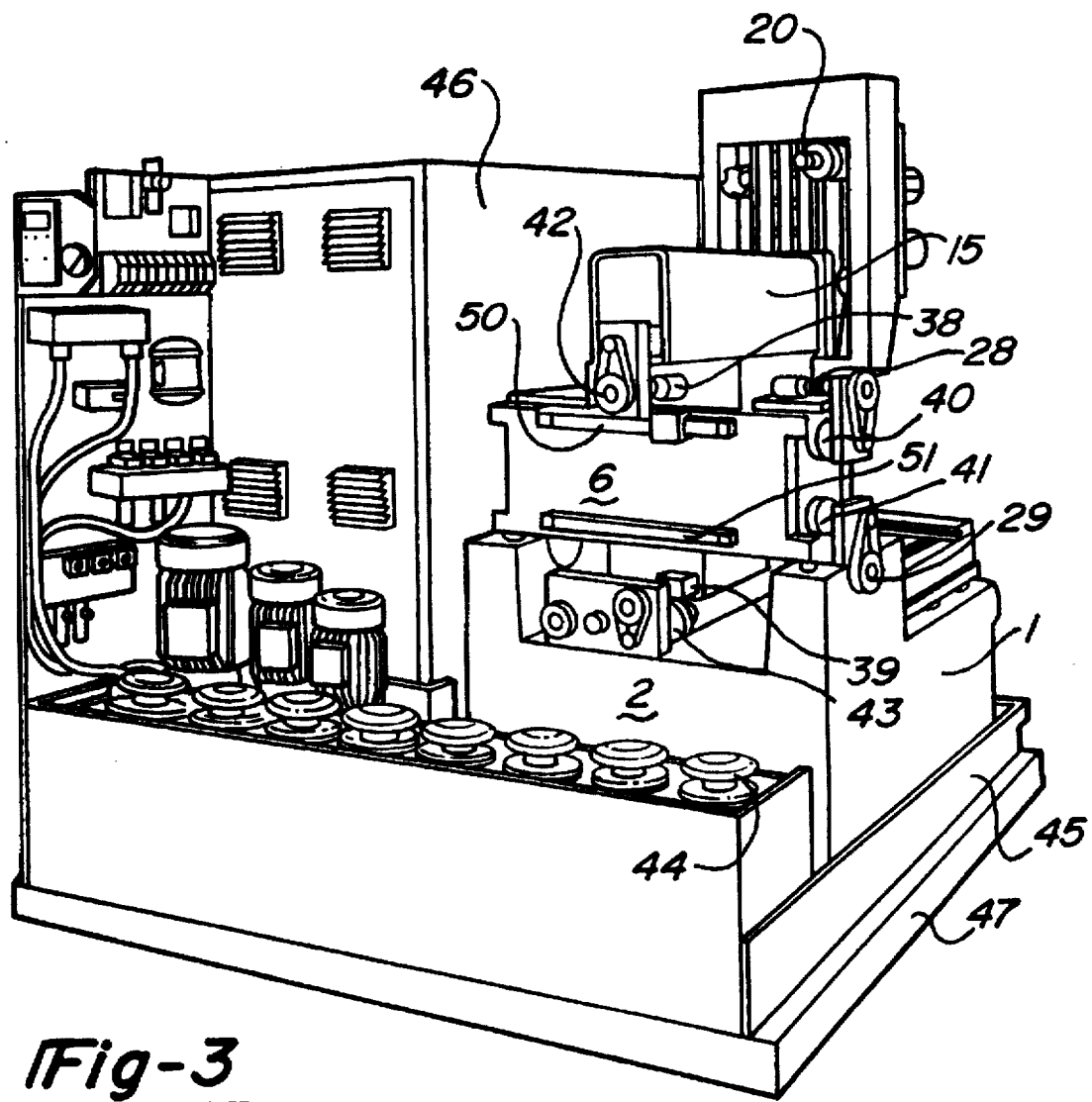
FIG. 3 illustrates a view of the rear part and one of the sides of the machine illustrated in FIG. 2. The same reference numbers are used in all three figures to identify identical parts.

The operation of the two cross-slide systems consisting of the saddle slide carriages 7 and 8, respectively 14 and 15, is shown in FIGS. 2 and 3 on which some of the elements which drive the saddle slide carriages 7, 8, 14 and 15 can be seen.

Each of the above-mentioned guiding rails 12, 13, 22 and 23, interacts with a sunk V shaped rail (not visible in the drawing) installed alongside the saddle slide carriages 7 and 14 on either side of the sunk central part, i.e. 26 on the lower side of the saddle slide carriage 14, and 27 (not visible in the drawing) on the upper face of the saddle slide carriage 7, respectively.

Likewise, a central protruding part, supporting two raised V-shape side tracks can be seen along the upper side of saddle slide carriage 14 and along the lower side of saddle slide carriage 7. These tracks (not visible in the drawing) function in conjunction with tracks mounted sideways in recesses provided along the upper elevation of saddle slide carriage 8 and the lower elevation of saddle slide carriage 15.

Needle cages are set between the raised tracks 12, 13, 22 and 23 and the sunk rails which interact with them, as well as between the rails guiding saddle slide carriages 8 and 15 on the saddle slide carriages 7 and 14 respectively. The movement of each of the saddle slide carriages 7, 8, 14 and 15 along these tracks is activated by a bolt connected to a motor by a belt; they are bolts 28 and 29 and motors 40 and 41 (see FIG. 2) for saddle slide carriages 14 and 7 respectively, and bolts 38 and 39 and motors 42 and 43 (see FIG. 3) for saddle slide carriages 15 and 8, respectively. These motors 40 and 41 are sheltered in the crossbeam 6. The motors 40 to 43 are controlled by the numerical control unit of the machine. Thus the saddle slide carriages 7 and 14 move transversely, in parallel to the frontal plane of the machine, below, respectively above the crossbeam 6 and along axis X1, and X2 respectively, while the saddle slide carriages 8 and 15 move perpendicularly along the frontal plane of the machine, below the carriage 7 and along the axis Y1 and above the saddle slide carriage 14 and along the axis Y2 respectively.

Thus the machining heads 18 and 19 may adopt any position in relation to the work piece, each independently of the other. It is possible to slant the wire more than 30° in a workpiece that has a height of 400 mm. The transverse movement of the lower machining head 18 is restricted only by the internal face of the walls 1 and 3 of the stand. That of the upper machining head 19 is limited only by the length of the crossbeam. The movement of the machining heads 18 and 19 along axes Y1 and Y2 is limited only by their thickness and for the upper head 19, by that of the saddle slide carriage 16.

In this example, the two cross-slide systems 7, 8, and 14, 15 are identical. Their travel along X and Y is 400 mm and 250 mm respectively. It is possible to machine a workpiece that has a height of up to 400 mm, a length of 850 mm, a width of 500 mm and weighs over 500 Kg!

As illustrated in FIGS. 2 and 3, the machine stand and the components necessary for the supply and recycling of the dielectric fluid, such as a filter battery 44, ventilation devices 48, are lodged in a tank 45. The latter and a switch cabinet 46 containing the impulses generator and the numerical control unit are secured on a common pallet 47.

This machine is actually very compact (3 m2). It covers a floor area of 1.8 m×1.6 m and is 2.23 m high.

Two linear optical gauges 50 and 51 can be seen to the rear of the crossbeam 6. They enable the exact positioning of each saddle slide carriage at the level of the workpiece; the effective cutting path through the workpiece can thus be determined with precision. The pressure sensors (not visible in the drawing) provide information on the flushing pressure.

In the machine described a workpiece that has a height of 60 mm can be machined at a speed of 250 mm2/mm by means of a laminated wire 54 whose diameter is 0.3 mm.

Figure 4:
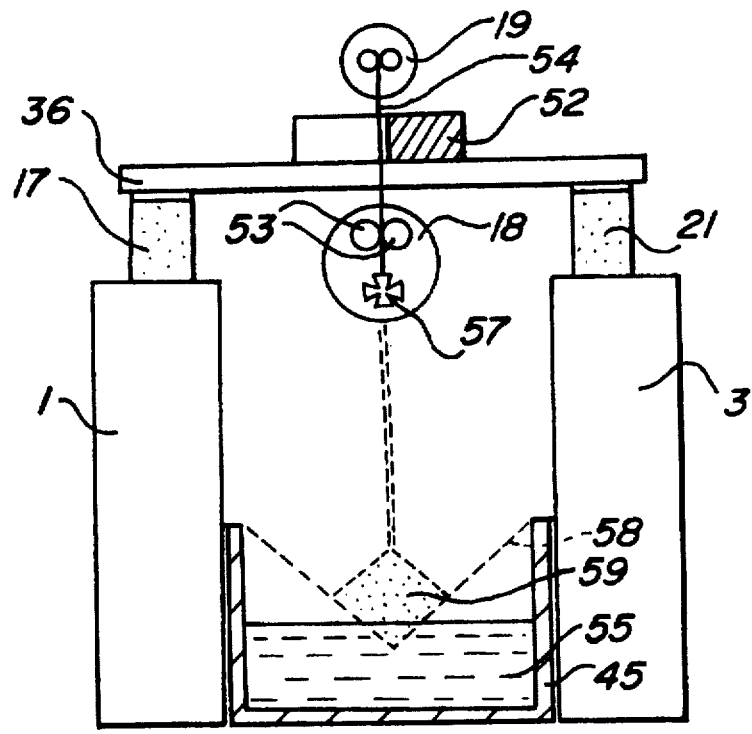
FIG. 4 and 5 show two further embodiments of the present invention; they relate also to a device for aspersion machining, but provided with means for cutting the used wire.

FIG. 4 shows a first variant of a machine for aspersion machining, according to the present invention. A device 57 for cutting the wire 54 in small pieces is integral with the lower machining head 18; the head 18 is also equipped with two rotary rollers 53 which pinch and pull the wire 54. The cutting device 57 mounted after these rollers may be of any kind known in the art. It is fitted in such a manner that the wire 54 having passed through the upper machining head 19, than through the workpiece 52 and then through the lower machining head 18 is cut in small pieces 59 by the cutting device 57 as it comes out of the unwinding rollers 53; these small wire pieces 59 fall down into a conical basket 58, mounted in the tank 45, and accumulate on the bottom of the basket 58. The used dielectric machining liquid 55 is collected in the tank 45 after having gone through the basket 58. The tank 45 is lodged between the walls 1 and 3 of the stand of the machine.

Figure 5:
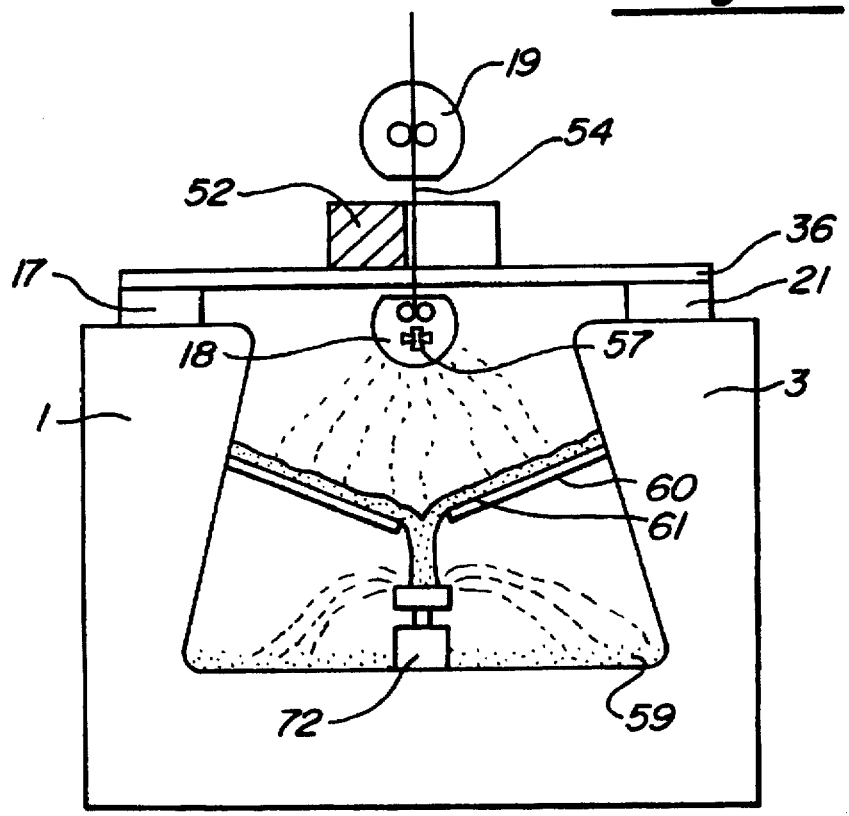

FIG. 5 illustrates a second variant of a machine for aspersion machining, according to the present invention. As above, the wire 54 is cut in small pieces 59 by a cutting device 57 mounted on the lower machining head 18. But these piece 59 no longer accumulate in a basket, but instead fall down in a conical element 60 separating the space enclosed by the walls 1 and 3 and extending under the machining head 18; a hole is provided in the middle of this element 60 which catches the wire pieces 59 as well as; the machining liquid thus washes away the wire pieces 59 along the slope of the element 60 and the mixture 61 of liquid carrying wire pieces 59 flows down into the tank 45. In order to avoid an accumulation of wire pieces 59 just under the hole in the middle of the element 60, a rotating device 72 of any known construction, is mounted in the middle of the bottom of the tank 45 to pick up the stream of mixture 61 and to spray it on the surface of the bottom of the tank 45. The tank 45 is in this example made up of the walls 1 and 3 and of the floor of the stand of the machine.

Both variants of FIGS. 4 and 5, in which the used wire is cut in small pieces, are advantageously used when a greater autonomy of the machine and a compacting of the waste wire is desired.

Figure 6A:
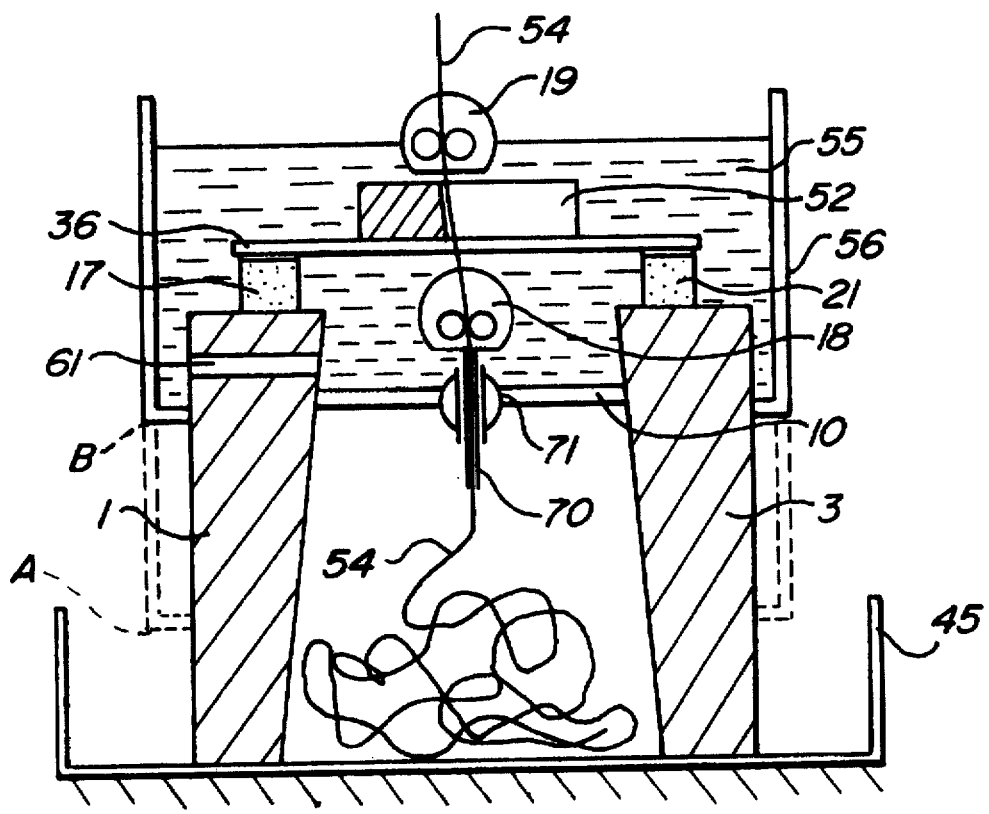
FIG. 6a, 6b and 7 show two embodiments of the present invention for immersion machining.
Figure 6B:
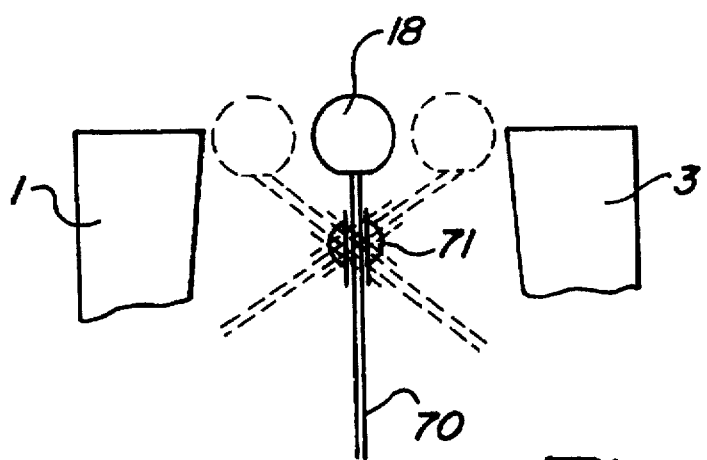

FIGS. 6a and 6b show a first variant of a machine for immersion machining, according to the present invention. The stand of the machine is provided with a protective device 56 which is movable vertically between two positions: a height position (position B), where it surrounds the machining zone, retaining the machining liquid up to the workpiece 52 and the upper machining head 19 for immersion machining; and a low position (position A), where the machining liquid is allowed to flow down through the duct 61, until the level of liquid is under the rail 36 supporting the workpiece 52. A tightened horizontal element 10 mounted under the machining zone, between the walls 1 and 3 also retains the liquid in the machining zone. A device 71 with a knee- or ball-and-socket joint and a pipe 71 is provided for allowing the wire 54 leaving the head 18 to cross the element 10 and to be collected in the tank 45. In that variant the used wire is collected in a receptacle which does not receive also (or only a small amount) the used machined liquid. When the device B is lowered to position A, the element 10 which is not movable, remains fixed at the same position. As shown on FIG. 6b, when the lower machining head 18 moves on horizontally, the pipe 70 can take various orientations in the joint 71 and is also sliding in it, following the head 18 which is more or less moving away from that fixed joint 71.

Figure 7:
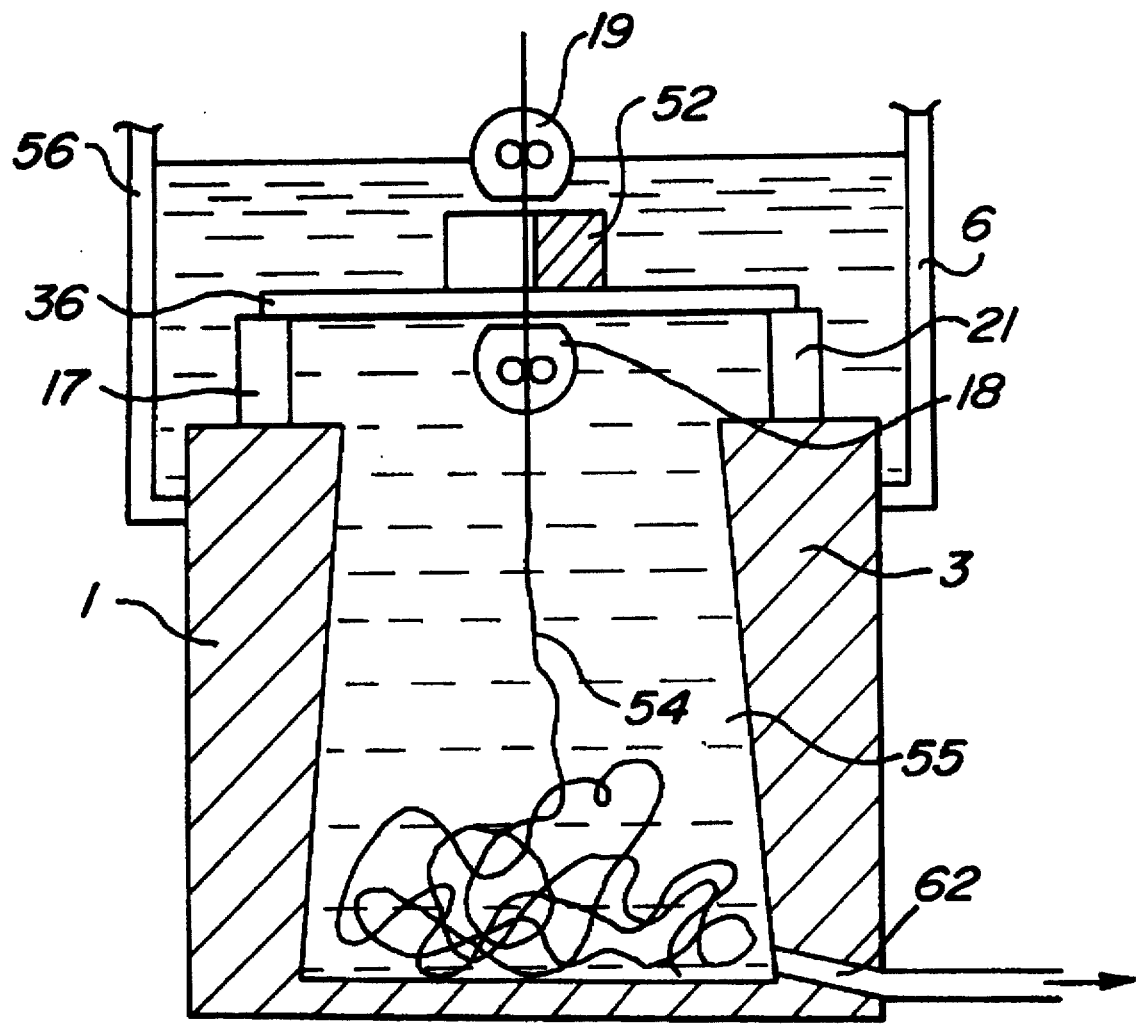

FIG. 7 shows another variant of a machine for immersion machining, according to the present invention. The stand of the machine is provided as for the first variant, with a protective device 56, but it is fixed in the present embodiment. No horizontal element 10 is mounted under the machining zone and, between the walls 1 and 3, the machining liquid immersing the machining zone being retained by the walls 1 and 3 of the stand and by the device 56. It is drained after machining through the duct 62. In this variant the used wire is collected in the same receptacle which receives the used machining liquid.

I claim:

1. A wire cutting spark erosion machine without either a work tank or a work table and having a stationary workpiece to be machined, said machine comprising a pair of arms carrying respectively an upper machining head and a lower machining head which guide an electrode-wire and inject machining fluid between the electrode wire and the workpiece and which is characterized by:

a stand made up of vertical elements, connected together to form a space open on one face pillars mounted directly on the stand and supporting a clamping system for the workpiece and a collector for the electrode wire after it has passed through the machining heads positioned inside the stand, under the clamping system, down below the vertical elements of the stand.

2. The machine according to claim 1, in which said arms are mounted on two cross-slide systems which are mounted on either side of a horizontal crossbeam secured firmly to the vertical elements of said stand so as to constitute a gantry.

3. The machine according to claim 1, in which the arm holding the lower machining head extends horizontally from one of the slides of one of the cross-slide systems, said slide being fitted to move the head along X and Y axes according to a predetermined path.

4. The machine according to claim 1, in which the cross-slide system is fitted to move the upper machining along X and Y axes according to a predetermined path in order to slant the wire according to angles varying as programmed, is identical to the cross-slide system fitted to move the lower machining head along the X and Y axes.

5. The machine according to claim 1, comprising also means to move the upper machining head along the vertical Z axis, said head being mounted on the upper carriage of the cross-slide system to move the head horizontally along the X and Y axes.

6. The machine according to claim 1, in which the movement of said device activating the vertical movement of the upper machining head is programmable for controlling the vertical position of said upper machining head.

7. The machine according to claim 1, in which each cross-slide system moves freely from one end of the crossbeam on which it is mounted to the other, unimpeded from any obstacle.

8. The machine according to claim 1, in which the cross-slide system is fitted to shift the relative position of the machining heads sufficiently for slanting the wire by an angle equal to or greater than 30°.

9. The machine according to claim 1, also comprising a partition wall arranged so as to let pass only the arms ending in the machining heads, thus separating the machining area from the cross-slide system and the mechanical devices activating the cross slide system.

10. The machine according to claim 1, where the collector for the used electrode wire is also fitted for receiving the spent dielectric machining fluid.

11. The machine according to claim 1, further comprising a cutting device mounted on the lower machining head and fitted to cut the used electrode wire leaving the lower machining head in small pieces.

12. The machine according to claim 1, further comprising means permitting the machining liquid to be up to the workpiece and the upper machining head.

13. A wire cutting spark erosion machine for machining a stationary workpiece, said machine comprising a pair of arms carrying respectively an upper machining head and a lower machining head which guide an electrode wire through said machining heads and which inject machining fluid between the electrode wire and the workpiece, and which is characterized by:

- a stand made up of vertical elements connected together by a base to form a space open on one face;
- pillars mounted directly on the stand and supporting a clamping system for the workpiece;
- a collector for the electrode wire after it has passed through the machining heads;
- said collector being positioned under the clamping system and below the vertical elements of the stand;
- said collector being positioned to collect said machining fluid after it has been injected between said electrodes; and
- said collector comprising a tank in which the base of the stand is immersed.

14. The machine according to claim 13, further comprising a sealing element fitted to isolate the used electrode wire from the spent dielectric machining fluid.

15. The machine according to claim 14, further comprising a telescopic or elastic pipe binding a liquid tight joint, mounted in a hole provided in the middle of the sealing element, with the lower machining head, allowing the used electrode wire to cross said sealing element.

16. The machine according to claim 13 in which the tank is secured on a pallet and includes a pulse generator and a numerical control unit contained in one or more electrical cabinets, also being mounted to said pallet.

17. The machine according to claim 16, also comprising a chamber arranged around said tank and stand around the pallet.

* * * * *

UNITED STATES PATENT AND TRADEMARK OFFICE
CERTIFICATE OF CORRECTION

PATENT NO. : 5,756,953
DATED : May 26, 1998
INVENTOR(S) : Hans Lehmann

It is certified that error appears in the above-identified patent and that said Letters Patent is hereby corrected as shown below:

Column 1, line 8, Insert "Field of the Invention" before line 8
Column 3, line 25, Delete the word "this" and insert -- the --.
Column 3, line 28, Delete "liquid tight in it", and insert -- submerged --.
Column 6, line 58, Delete the words "is resting", and insert --rests --.
Column 6, line 57, Insert -- a -- after the word "which."

Column 9, line 15, Delete the word "piece" and insert -- pieces --.
Column 10, line 10, Insert -- , -- at the end of the sentence.

Signed and Sealed this

Tenth Day of August, 1999

Attest:

Q. TODD DICKINSON

*Attesting Officer*    *Acting Commissioner of Patents and Trademarks*